United States Patent [19]

Pütz

[11] 4,234,337
[45] Nov. 18, 1980

[54] METHOD OF PRODUCING SINTERED FRICTION LAMINAE

[75] Inventor: Hermann Pütz, Schongau, Fed. Rep. of Germany

[73] Assignee: Hoerbiger & Co., Schongau, Fed. Rep. of Germany

[21] Appl. No.: 965,995

[22] Filed: Dec. 4, 1978

[30] Foreign Application Priority Data

Dec. 2, 1977 [AT] Austria .................. 8646/77

[51] Int. Cl.$^3$ .......................... B22F 3/00; B22F 5/00
[52] U.S. Cl. ...................... 75/208 R; 75/224
[58] Field of Search ................. 75/208 R, 224

[56] References Cited

U.S. PATENT DOCUMENTS

| 2,251,410 | 8/1941 | Koehring et al. | 75/208 R |
|---|---|---|---|
| 2,332,733 | 10/1943 | Lignian | 75/208 R |
| 3,891,473 | 6/1975 | Latva | 75/224 |
| 4,028,100 | 6/1977 | Latva | 75/224 |

OTHER PUBLICATIONS

*Powder Metallurgy Equipment Manual* (1977), pp. 138, 139. Metal Powder Industries Federation p. 64.

*Primary Examiner*—Brooks H. Hunt
*Attorney, Agent, or Firm*—Watson, Cole, Grindle & Watson

[57] ABSTRACT

Sintered friction laminae are produced by scattering metal powder on a steel substrate and then sintering the powder/substrate article in a furnace with free nitrogen in the furnace atmosphere, which atmosphere is continually renewed. The nitrogen is produced by decomposition of ammonia and diffuses into the steel substrate to harden the steel.

3 Claims, No Drawings

METHOD OF PRODUCING SINTERED FRICTION LAMINAE

BACKGROUND OF THE INVENTION

The present invention relates to a method of producing sintered friction laminae for clutches and brakes by scattering metal powder over a steel substrate and sintering the powder in a sintering furnace in a protective gas atmosphere containing nitrogen, in particular split ammonia gas.

In multiple disc clutches and brakes, sintered friction laminae are used which consist of steel substrates which are provided on one or both sides with a friction coating sintered thereon and which comprise driver elements, e.g., teeth for the transmission of power, on at least one of their edges, on the inside, and/or the outside. The efficiency of such clutches and brakes is determined to a large extent by the durability of the steel substrates and in particular the driver elements thereof. However, even with regard to the dimensions and the weight of the clutches and brakes, it is impossible to employ steel substrates of excessive dimensions. Therefore fatigue fractures of the friction laminae occur in particular in the clutches and brakes of heavy duty drives and reversing drives. Moreover, wear effects occur at the driver elements, which effects are caused by the impact between the co-operating driver elements of the friction laminae and the receiving flanks of the engaging bodies.

In order to provide a remedy, endeavours have been made to increase the resistance of the steel substrates and to render them more resistant in particular in the critical zones. The increase of the life by the use of steels of higher quality or by hardening the steel substrates by means of a heat treatment is, however, not possible without difficulties. During the heating in the sintering furnace when the friction coatings are sintered upon the substrates, the latter are also heated and annealed to a greater or lesser extent. Therefore, hardening the steel substrates prior to sintering is only partly effective. Belated hardening after the deposition of the sintered friction coatings is opposed by the fact that the friction coatings are influenced disadvantageously by such a heat treatment, in particular when friction coating components are used the melting temperatures of which are lower than the hardening temperature. Even the induction hardening sometimes used for the steel substrates in the region of the teeth does not provide any substantial increase of the life resistance, although it does lead to an increase of the wear resistance in the region of the flanks of the teeth.

In more recent times, the application of the thermochemical diffusion treatment has become known for increasing the life and the wear resistance of steel components. In this case a diffusion of various elements, such as nitrogen, carbon, boron and chromium is enforced in particular at the critically loaded locations of the steel components. In the case of sintered fricton laminae an improvement of the edge layer properties of the steel support members in conjunction with an increase of the life could be attained by a nitrogenizing treatment. For this purpose, however, a proper heat treatment process of the finished sintered friction laminae is necessary which renders the production method considerably more expensive and is therefore used only in critical load cases.

Finally, it is known from German Pat. No. 950,298 to carbonize clutch laminae with a coating layer sintered thereon, at certain locations which are to have an increased rigidity; the carbonizing being performed simultaneously with the sintering. After the steel substrates have been provided with the friction coatings, the deposited coating is removed from the steel substrates at the locations to be carbonised, i.e., in the region of the teeth. Thereupon the laminae are stacked one upon the other at the locations to be carbonized with the interposition of a graphite or carbon disc or any other carbon delivering insert means, and are subjected to a heat treatment. This method is complicated and not suitable for modern mass production for cost reasons. Moreover, carbonizing is effected at temperatures around 900° C., whereas for pressure sintering mainly used for sintered friction laminae produced by the scatter method, the temperatures lie in a considerably lower region. Moreover, the rigidity properties are not improved by a sufficiently great amount even by this carbonizing, in particular since effective hardening by carbonizing is possible only in conjunction with subsequent quenching baths which, however, cannot be used on account of the sintered friction coating.

The object of the invention is to improve the production method referred to above, of sintered friction laminae, in such a manner that a thermochemical diffusion treatment of the steel substrates and thus an increase of the life of the friction laminae is attained without an increase worth mentioning of the cost of the production of, and without a disadvantageous effect on, the friction coatings.

SUMMARY OF THE INVENTION

The method according to the invention consists in that during the thermal sintering process in the protective gas atmosphere, additionally ammonia is split in the sintering furnace with the release of nitrogen, is continuously circulated while flowing over the sinter charge and is continuously renewed. In this case the invention is based on the recognition that a thermo-chemical diffusion treatment in the form of a nitrogenizing treatment is possible simultaneously during the sintering process and under the thermal conditions prevailing there, provided it is possible to liberate a sufficient supply of diffusing nitrogen in the region of the steel substrates. It has been found that this can be attained in a simple manner by the measures according to the invention. Namely, in a certain temperature phase of the sintering process the surfaces of the steel substrates of the sintered friction laminae and the steel walls of the sintering furnace act as catalysts and effect the decomposition of the ammonia gas into the component parts nitrogen and hydrogen. The supply of the nitrogen to the surface of the steel substrate is favored by the porosity of the sintered friction coatings, a nitrogenizing effect occurring also in the region of the friction coatings through the sinter skeleton. In this way it is possible to obtain sintered friction laminae with considerably improved rigidity properties without additional heat treatment and practically without additional costs, owing to the incorporation of the nitrogenizing treatment in the sintering process.

In a further embodiment of the method according to the invention, a purging gas may be guided through the sintering furnace after the termination of the thermal sintering process, for the purpose of accelerated cooling of the sintered charge. Owing to this measure, the production time for the sintered friction laminae is shortened, and also the later separation of the dissolved nitride is reduced, and, moreover, the formation of coarse grain due to re-crystallization in the steel substrate structure is avoided.

Finally, it is further possible within the scope of the method according to the invention to utilize a protective gas or a carrier gas supplied together therewith which contains carbon, oxygen and hydrogen in addition to nitrogen, and perhaps even other elements which it is desired to diffuse into the surface of the steel substrates of the friction laminae, in order to adjust the properties of the latter to certain requirements.

One embodiment by way of example of the method according to the invention is described below with reference to the production of sintered friction laminae.

First a metal powder is scattered with a highly uniform distribution over a steel substrate with a bright surface which may consist of alloyed steel with a high carbon content. This metal powder is slightly sintered, whereupon the coated friction coating is pressed to the desired degree and finally subjected to the pressure sintering process. This pressure sintering is effected in protective gas hooded furnaces under defined conditions of temperature and time which depend inter alia upon the respective powder mixtures used. The protective gas used is ammonia and a carrier gas which is composed of carbon, oxygen and hydrogen. The sintering temperature lies at approximately 570° C.

The protective gas inclusive of the carrier gas is continuously renewed during the sintering process. For this purpose, the hooded furnace is provided with a suitable extraction device and with a gas supply means. Within the sintering furnace, the surfaces of the steel substrate of the friction laminae act as catalyst and thus effect the decomposition of the ammonia gas supplied into its component parts nitrogen and hydrogen. Moreover, the protective gases in the sintering furnace are continuously circulated, e.g., by means of blowers built into the furnace. In conjunction with the continuous renewal of the split protective gases an excess supply of nitrogen is maintained at the surfaces of the steel substrate, not only in the region of the non-coated edge teeth, but also in the region of the friction coatings owing to the porosity of the sintered layer. In this manner diffusion of nitrogen is obtained, whereby nitrides are produced in the surface region of the steel substrate which increase considerably the rigidity properties of the latter, in particular also the durability. Additionally, mixed crystals and combination crystals are formed with the iron by the diffusing carrier gases, in particular very hard carbides, carbonitrides and oxycarbo-nitrides which likewise improve the rigidity properties.

For reasons of safety, a reaction furnace may be connected to the sintering furnace and the combustible component parts of the protective gases extracted from the sintering furnace, in particular excess hydrogen, are burnt therein. Finally, a purging gas may be supplied to the sintering furnace for the purpose of accelerating the cooling of the sintered and nitrogenised charge.

Thus, in the production of sintered friction laminae by means of the pressure sintering process, a nitrogenizing effect is obtained by means of the method described, substantially without additional expenditure; this effect leads to a considerably improved end product. There is no additional operating step required, such as quenching of the hardened steel substrates which might cause the sintered friction coatings to be damaged. In the case of sintered friction coatings with additions of iron an increase of the friction value and a reduction of the wear is obtained by the thermal diffusion treatment. Moreover, an increased corrosion resistance of the exposed steel surfaces has also been found. The alterations to a conventional sintering furnace are relatively small: it is merely necessary to provide means for the continuous supply and removal of the protective gas as well as for the circulation thereof in the sintering furnace itself.

I claim:

1. In a method of producing sintered friction laminae for use in clutches and brakes wherein a metal powder is first scattered over a steel substrate and then is sintered thereon in a sintering furnace which contains a nitrogen-containing protective atmosphere, the improvement wherein said protective atmosphere comprises a continuous stream of ammonium-containing protective gas which flows around said steel substrate with metal powder scattered thereon, wherein the temperature of said sintering furnace is controlled to be above that which causes the ammonia in said protective gas to decompose into nitrogen and hydrogen adjacent said steel substrate with metal powder scattered thereon, and wherein the amount of ammonia in said protective gas and the flow rate of said protective gas around said steel substrate with metal powder thereon is controlled so as to create an excess of nitrogen therearound such that nitrogen will diffuse into the surfaces of the steel substrate and form nitrides, thereby increasing the life and wear resistance of the steel substrate of the formed sintered friction laminae.

2. The method of claim 1 wherein after the metal powder has been sintered onto said metal substrate and nitrogen has diffused into said metal substrate, the heat of said sintering furnace is stopped, the flow of protective gas around said sintered friction laminae is stopped, and a purging gas is caused to flow through said sintering furnace and around the sintered friction laminae so as to accelerate cooling thereof.

3. The method of claim 1 wherein said protective gas also includes a carrier gas which comprises carbon, oxygen and hydrogen.

* * * * *